United States Patent [19]

Greenler

[11] 4,407,650

[45] Oct. 4, 1983

[54] ADJUSTABLE SEAL FOR GLASS SHEET FURNACE

[76] Inventor: Robert J. Greenler, 29071 Belmont Lake Rd., Perrysburg, Ohio 43551

[21] Appl. No.: 365,696

[22] Filed: Apr. 5, 1982

[51] Int. Cl.³ .............. F27D 1/18; F27B 25/00; C03B 18/00
[52] U.S. Cl. .................... 432/242; 34/242; 65/182.5; 65/374.13; 65/374.15
[58] Field of Search .......... 432/242; 34/242; 65/354, 374.13, 374.15, 182.5

[56] References Cited

U.S. PATENT DOCUMENTS

| | | | |
|---|---|---|---|
| 2,742,273 | 4/1956 | Skivesen | 432/242 |
| 2,929,614 | 3/1960 | Young et al. | 432/242 |
| 2,963,001 | 12/1960 | Alexander | 34/242 |
| 3,404,973 | 10/1968 | Nedelec | 65/374.13 |
| 3,712,801 | 1/1973 | Schlehr | 65/374.13 |
| 3,934,970 | 1/1976 | McMaster et al. | 432/242 |
| 3,947,242 | 3/1976 | McMaster et al. | 432/122 |
| 3,994,711 | 11/1976 | McMaster et al. | 65/163 |
| 4,222,764 | 9/1980 | Revells et al. | 65/374.13 |

*Primary Examiner*—John J. Camby
*Attorney, Agent, or Firm*—Brooks & Kushman

[57] ABSTRACT

An adjustable seal (20) for an access opening (58) of a furnace (12) including a horizontal conveyor (30) for conveying glass sheets within the furnace heating chamber. The adjustable seal (20) includes an elongated ceramic seal member (60) of fused silica having a rotational axis about which a support (62) rotatably mounts the seal member above the access opening (58) of the furnace. An elongated sealing portion (64) of the seal member (60) moves toward and away from the plane of conveyance upon rotation of the seal member to thereby control the size of the opening. The ceramic seal member (60) preferably includes a pair of round ends (66) having associated end caps (80) and a pair of bearings (68) for mounting the end caps. An intermediate section (70) between the round ends has an outer surface including a partially circular surface (72) and a flat surface (74) which have a junction defining the sealing portion (64). The adjustable seal (20) can be used at both entrance and exit ends of the furnace but has particular utility at the exit end when utilized in a tempering system adjacent its quench unit to thereby prevent quenching air from entering the furnace.

15 Claims, 4 Drawing Figures

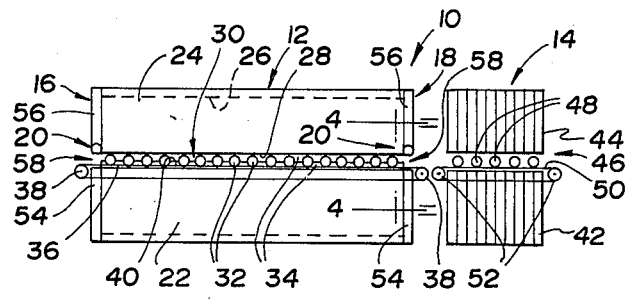
Fig. 1
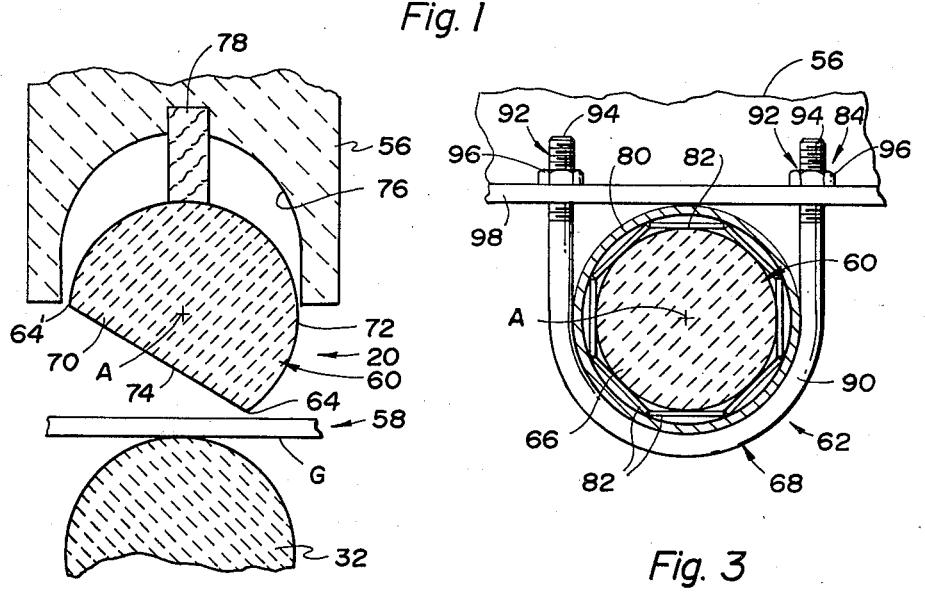
Fig. 2
Fig. 3
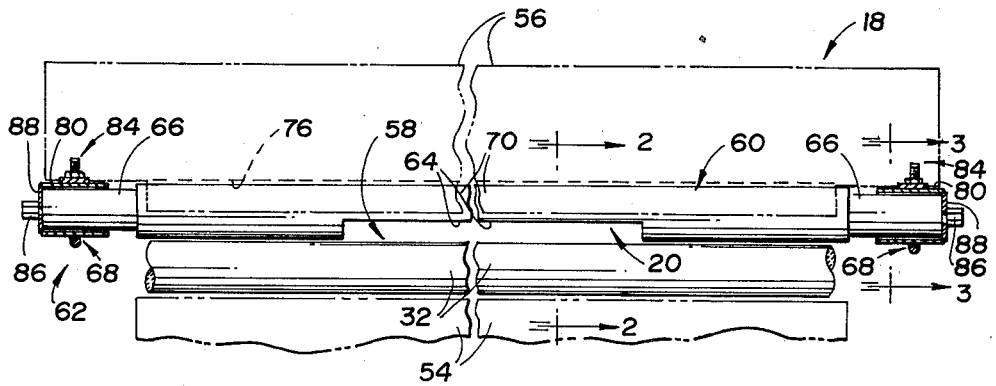
Fig. 4

ADJUSTABLE SEAL FOR GLASS SHEET FURNACE

TECHNICAL FIELD

This invention relates to a furnace for heating glass sheets on a horizontal conveyor for processing.

BACKGROUND ART

One type of furnace used in glass processing systems to heat glass sheets for processing includes a horizontal conveyor for conveying glass sheets through the furnace for heating within a heating chamber of the furnace. Two types of horizontal conveyors are conventionally utilized. One type is gas hearth conveyors which convey glass sheets horizontally while supported on a thin film of pressurized gas with the conveyance being provided by a moving frame toward which the plane of conveyance is tilted a very slight extent. The other type is roller conveyors which include rolls spaced along the direction of conveyance such that rotational driving thereof conveys glass sheets supported on the rolls. With both types of conveyors, the furnace conventionally includes a horizontally elongated access opening at both its entrance and exit ends. Such entrance and exit openings to the furnace heating chamber along the plane of conveyance through the furnace must have a sufficient vertical height to allow glass sheets to enter and exit the furnace but should not have an excessively large size as this will permit heat to be unnecessarily lost to the environment.

In flat glass tempering systems including the type of horizontal conveyor described above, a quench unit is conventionally located adjacent the exit opening to provide tempering of heated glass sheets conveyed on a roller conveyor of the quench unit. Upper and lower blastheads of the quench unit oppose each other to provide quenching air that cools the upper and lower surfaces of the heated glass sheet which is conveyed therebetween in order to perform the tempering. One problem usually involved is that a certain amount of the quenching air from the quench unit enters the furnace through the adjacent exit opening. This quenching air not only lowers the temperature of the furnace heating chamber but can also prematurely cool a heated glass sheet just prior to transfer thereof from the furnace to the quench unit. This problem is conventionally referred to in the flat glass tempering industry as "blow-back."

In order to avoid the blow-back problem discussed above, furnaces of prior glass tempering systems have included a pivotal door that is movable to an open position to allow the heated glass sheet to be transferred from the furnace to the quench unit whereupon the door is moved to a closed position to prevent the quenching air from entering the furnace. However, such doors are mounted in a relatively hot environment and it is thus somewhat costly to construct and maintain the door operating mechanism. Furthermore, during transfer of the heated glass sheet from the furnace to the quench unit, quenching air can still flow along the upper surface of the glass sheet into the furnace with the door in its open position.

U.S. Pat. Nos. 3,934,970, 3,947,242, and 3,994,711 each disclose a glass tempering system including a furnace having an upper housing with end walls that define the upper extremities of entrance and exit openings at opposite ends of the furnace. A counterbalance mechanism of the furnace raises and lowers the upper housing and thereby controls the size of the entrance and exit openings. Suitable adjustment of the openings provides a sufficient vertical height so as to allow glass sheets to be conveyed into and out of the furnace while not being so great as to allow excessive heat loss through the openings or an excessive amount of quenching air to enter the furnace through the exit opening. However, raising of the upper housing to accommodate thicker glass at the entrance and exit openings also leaves a gap at each lateral side of the furnace through which heat loss can take place. Furthermore, the end walls are subjected to a relatively high temperature that makes it difficult to maintain straight edges for defining the upper extremities of the entrance and exit openings.

DISCLOSURE OF INVENTION

An object of the present invention is to provide an adjustable seal for an access opening of a horizontal conveyor type furnace for heating glass sheets.

In carrying out the above object, the furnace incorporating the adjustable seal includes a heating chamber and a horizontal conveyor for conveying the glass sheets through the furnace for heating thereof within the heating chamber while being conveyed along a generally horizontal plane. The access opening to the heating chamber of the furnace has a horizontally elongated shape along the plane of conveyance extending in a lateral direction to the direction of conveyance in order to permit glass sheet conveyance into or out of the furnace.

The adjustable seal for the access opening of the furnace includes an elongated ceramic member of fused silica having a rotational axis extending along its length. A support of the seal rotatably mounts the ceramic seal member about its rotational axis above the access opening of the furnace. The ceramic seal member has an elongated sealing portion that moves toward and away from the plane of conveyance upon rotation of the seal member to thereby control the size of the opening.

Adjusting rotation of the ceramic seal member is performed to move the sealing portion thereof toward the plane of conveyance with just enough spacing therebetween to prevent heat loss to the environment while still permitting glass sheet conveyance into or out of the furnace at the opening. Also, the composition of the ceramic seal member of fused silica, which has a relatively low coefficient of thermal expansion, permits the elongated sealing portion to maintain a generally straight edge during heating and cooling in order to provide an opening of a uniform height along its entire extent.

In the preferred construction of the seal, the ceramic seal member includes a pair of round ends and the support includes a pair of bearings that respectively mount the round ends of the seal member to permit the rotational adjustment. Between its round ends, the ceramic seal member has an intermediate section including an outer surface having a partially circular surface and a flat surface which have a junction defining the sealing portion of the seal member.

The furnace with which the seal is utilized preferably includes an end wall on which the seal member is mounted by the pair of bearings. An elongated groove in the end wall receives the seal member whose sealing portion extends downwardly therefrom for an adjustable extent dependent upon the rotational position of the seal member. A seal device is mounted within the groove of the end wall and slidably engages the partially circular surface of the intermediate section of the seal member to provide a sealed condition.

Each round end of the ceramic seal member preferably includes an associated end cap, and the pair of bearings respectively mount the pair of end caps to provide the rotational support of the seal member. At least one of the bearings includes a locking device for selectively and alternately locking the seal member against rotation in any adjusted position or for permitting such rotation in order to allow adjustment to provide the required size opening. At least one of the end caps includes an adjuster for rotating the seal member to move the sealing portion of the seal member toward or away from the plane of conveyance to adjust the opening size. As disclosed, each bearing includes an associated locking device and each end cap includes an associated adjuster.

The preferred bearing construction includes a U-shaped clamp that receives the associated end cap to provide mounting of the ceramic seal member on the end wall of the furnace. Each locking device includes adjustable connectors for securing the associated U-shaped clamp to the end wall in an adjustable manner to selectively and alternately either clamp the end caps against the end wall to prevent rotation of the seal member or unclamp the end caps from the end wall in order to permit rotational adjustment when required to adjust the vertical size of the opening.

The preferred embodiment of the furnace disclosed includes entrance and exit ends that each have one of the adjustable seals. At the entrance end, an entrance access opening has a size controlled by the adjusted position of the associated seal to prevent heat loss to the environment. Likewise, at the exit end, an exit access opening also has a size controlled by the associated seal to prevent heat loss to the environment.

The adjustable seal of the invention has particular utility when used with a furnace having a horizontal roller type conveyor including a plurality of rolls spaced along the length of conveyance to convey glass sheets during heating. The sealing portion of the seal member is positioned so as to be spaced above the conveyor rolls a distance just slightly greater than the thickness of the glass sheets being heated.

The furnace disclosed is used in a glass sheet tempering system including a quench unit located adjacent the exit opening and having upper and lower blastheads for supplying quenching air to a heated glass sheet therebetween to provide tempering of the glass sheet. The adjustable seal has particular utility at the exit opening of the furnace adjacent the quench unit to prevent quenching air from entering the furnace through the exit opening. In addition, as previously mentioned, the entrance end of the furnace also includes an identical adjustable seal for preventing heat loss to the environment through the entrance opening of the furnace.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic side elevation view of a flat glass sheet tempering system having an adjustable seal constructed in accordance with the present invention for an access opening of the furnace;

FIG. 2 is a cross-sectional view of the adjustable seal taken along the direction of line 2—2 in FIG. 4 to illustrate the construction of an intermediate section of a ceramic seal member of the seal;

FIG. 3 is a cross-sectional view through the seal taken along the direction of line 3—3 in FIG. 4 to illustrate the construction of the ends of the ceramic seal member and a rotational support that rotatably mounts the seal member; and FIG. 4 is an elevation view taken in the direction of line 4—4 in FIG. 1 to further illustrate the construction of the adjustable seal.

BEST MODE FOR CARRYING OUT THE INVENTION

Referring to FIG. 1 of the drawings, a glass sheet tempering system for tempering flat glass is indicated generally by reference numeral 10. Tempering system 10 includes a furnace 12 in which flat glass sheets are heated in preparation for tempering and also includes a quench unit 14 to which the heated glass sheets are transferred from the furnace to perform the tempering operation. As is hereinafter more fully described, entrance and exit ends 16 and 18 of furnace 12 each include an associated adjustable seal 20 that is constructed in accordance with the present invention to control the vertical size of an associated access opening of the furnace.

With continuing reference to FIG. 1, furnace 12 includes lower and upper housings 22 and 24 that cooperate to define a heating chamber 26 in which glass sheets are heated in preparation for the tempering operation. At each lateral side of the furnace 12, the lower and upper housings 22 and 24 define side slots 28. A horizontal conveyor 30 of the furnace includes conveyor rolls 32 spaced along the direction of conveyance within the heating chamber 26 and having opposite ends that extend outwardly through heat seals 34 at the side slots 28. At each lateral side of the furnace, an associated continuous drive loop 36 preferably embodied by a toothed chain is received by a pair of rotatable chain sprockets 38 located at the furnace entrance and exit ends 16 and 18. Driving sprocket rotation moves each drive loop 36 over an associated horizontal support surface 40 with the conveyor rolls 32 supported on the drive loop so as to be rotatively driven. Such driving rotation conveys a heated glass sheet within the furnace during the heating in preparation for the tempering.

Quench unit 14 of the tempering system 10 shown in FIG. 1 includes conventional lower and upper blastheads 42 and 44 that oppose each other and supply pressurized quenching air to a heated glass sheet received therebetween from the furnace. A conveyor 46 of the quench unit includes rolls 48 whose opposite ends are each supported and frictionally driven by an associated continuous drive loop 50 in the form of a toothed chain that is received by a pair of chain sprockets 52.

With combined reference to FIGS. 1, 2, and 4, the lower and upper housings 22 and 24 include refractory end walls 54 and 56, respectively, at both the entrance and exit ends 16 and 18 of the furnace. Lower and upper end walls 54 and 56 cooperate to define an access opening 58 to the furnace heating chamber along the plane of conveyance of a glass sheet G (FIG. 2) through the furnace. At the entrance end 16, the end walls define an entrance access opening 58 through which glass sheets are conveyed into the furnace from a suitable loading conveyor. At the exit furnace end 18, the end walls define an exit access opening 58 through which the heated glass sheets are conveyed out of the furnace and to the quench unit 14 for tempering in the manner previously described. Both the entrance and exit openings 58 have a vertical height that is controlled by the associated adjustable seal 20.

With reference to FIGS. 2 and 4, the adjustable seal 20 constructed in accordance with the present invention includes an elongated ceramic seal member 60 that is made of fused silica and has a rotational axis A extending along its length. A support generally indicated by 62 (FIG. 4) rotatably mounts the ceramic seal member 60 about its rotational axis above the associated access opening 58 of the furnace. The ceramic seal member 60 has an elongated sealing portion 64 that is moved toward and away from the plane of conveyance upon rotation of the seal member to thereby control the size of the opening 58 by adjusting its vertical height.

Adjustment of the size of each access opening 58 of furnace 12 provides more effective operation during the heating and tempering operation. At both the entrance and exit ends 16 and 18, both seals 20 are adjusted as illustrated in FIG. 2 such that the spacing between the sealing portion 64 and the upper surfaces of the conveyor rolls 32 is just slightly greater than the thickness of the glass sheets G being heated. Such adjustment minimizes the heat loss to the environment at the entrance end 16. At the exit end 18, the adjustment likewise minimizes heat loss to the environment and additionally prevents quenching air delivered at the quench unit from blowing back into the furnace through the exit access opening 58. Construction of the seal member 60 from fused silica enables the sealing portion 64 to maintain a straight edge during heating and cooling since this material has a relatively low coefficient of thermal expansion and thus is not subjected to thermal warpage. Also, manufacturing of the seal member 60 is facilitated by sinter bonding fused silica particles since the sinter bonding takes place at a much lower temperature than the fusing temperature of silica.

As illustrated in FIGS. 3 and 4, the ceramic seal member 60 includes a pair of round ends 66 respectively located at the opposite lateral sides of the furnace. The rotational support 62 for the seal member 60 includes a pair of bearings 68 that respectively mount the round ends 66 of the seal member at the opposite lateral sides of the furnace to permit the rotational adjustment that controls the size of the associated access opening 58.

With reference to FIGS. 2 and 4, the ceramic seal member 60 includes an intermediate section 70 between its round ends 66. Intermediate section 70 of the ceramic seal member 60 has an outer surface including a partially circular surface 72 and a flat surface 74 which have a junction defining the sealing portion 64 of the seal member. In addition, the partially circular and flat surfaces 72 and 74 also have a junction defining another sealing portion 64' that can be utilized by rotation of the seal member counterclockwise from the position shown in FIG. 2 into proximity with the upper surface of the conveyed glass sheets G. It should also be mentioned that the partially circular surface 72 of the ceramic seal member 60 and the associated conveyor rolls 22 have the same diameter as each other. Ease of manufacturing the ceramic seal member 60 is achieved by starting with a conveyor roll 32 and then grinding the flat surface 74 at the intermediate section 70 to thereby provide the construction described.

With reference to FIGS. 3 and 4, the upper end wall 56 of the furnace has the associated ceramic seal member 60 mounted thereon by the pair of bearings 68. An elongated groove 76 (FIG. 2) in the end wall 56 receives the ceramic seal member 60 while permitting rotational adjustment thereof to control the size of the access opening 58. A seal device 78 of a high temperature felt material is received within the groove 76 and slidably engages the partially circular surface 72 of the intermediate section 70 of the seal member in order to provide a sealed condition.

Each round end 66 of the seal member 60 as seen in FIGS. 3 and 4 includes an associated end cap 80 that preferably has an annular sleeve construction and is made from a suitable steel. Leaf springs 82 are interposed between the ceramic seal member end 66 and the end cap 80 and are resiliently deflected sufficiently at room temperature so as to remain deflected upon heating in order to maintain the mounted relationship of the end cap on the seal member end. At least one of the bearings 68, and preferably both of the bearings as illustrated, includes a locking device 84 for selectively and alternately locking the seal member 60 against rotation or permitting such rotation in order to allow the adjustment of the access opening size as previously described. Also, at least one of the end caps 80, and preferably both of the end caps as illustrated, includes an adjuster 86 for rotating the seal member 60 to move the sealing portion 64 of the seal member toward or away from the plane of conveyance. As illustrated, each adjuster 86 comprises a hexagonal lug mounted by an end plate 88 on the end cap 80 in any suitable manner such as by welding. Upon release of the locking devices 84, a wrench is engaged with one of the hexagonal lug adjusters 86 to provide the rotational adjustment as required.

As best illustrated in FIG. 3, each bearing 62 preferably includes a U-shaped clamp 90 for mounting the seal member 60 on the associated end wall 56. Each locking device 84 includes a pair of adjustable connections 92 for securing the associated U-shaped clamp 90 to the end wall 56 in an adjustable manner. Connections 92 each comprise threaded terminal ends 94 on the U-shaped clamp 90 and nuts 96 for securing the ends to an apertured plate 98 through which the clamp ends are inserted. Tightening of the nuts 96 locks the end cap 80 against the plate 98 to position the seal, while loosening of the nuts releases the end cap to permit the rotational adjustment.

While the best mode for carrying out the invention has herein been described in detail, those familiar with the art to which this invention relates will recognize various alternative designs and embodiments for practicing the present invention as defined by the following claims.

What is claimed is:

1. In a furnace including a heating chamber, a horizontal conveyor for conveying glass sheets through the furnace for heating thereof within the heating chamber while being conveyed along a general horizontal plane, and a horizontally elongated access opening to the heating chamber along the plane of conveyance through the furnace, an adjustable seal for the access opening comprising: an elongated ceramic seal member of fused silica having a rotational axis extending along the length thereof; a support that rotatably mounts the ceramic seal member about its rotational axis above the access opening of the furnace; and the ceramic seal member having an elongated portion that moves toward and away from the plane of conveyance upon rotation of the seal member to thereby control the size of the opening.

2. A furnace as in claim 1 wherein the ceramic seal member includes a pair of round ends and the support including a pair of bearings that respectively mount the round ends of the seal member.

3. A furnace as in claim 2 wherein the ceramic seal member includes an intermediate section between the round ends thereof, and the intermediate section having an outer surface including a partially circular surface and a flat surface which have a junction defining the sealing portion of the seal member.

4. A furnace as in claim 3 which includes an end wall on which the seal member is mounted by the pair of bearings, the end wall including an elongated groove that receives the seal member, and a seal device within the groove for slidably engaging the partially circular surface of the intermediate section of the seal member.

5. A furnace as in claim 2 or 3 wherein each round end of the ceramic seal member includes an associated end cap, the pair of bearings respectively receiving the pair of end caps to provide rotational support of the seal member, at least one of the bearings including a locking device for selectively and alternately locking the seal member against rotation or permitting such rotation, and at least one of the end caps including an adjuster for rotating the seal member as permitted by the locking device to move the sealing portion of the seal member toward or away from the plane of conveyance.

6. A furnace as in claim 5 wherein each bearing includes an associated locking device and wherein each end cap includes an associated adjuster.

7. A furnace as in claim 6 which includes an end wall on which the seal member is mounted, each bearing including a U-shaped clamp, and each locking device including adjustable connections for securing the associated U-shaped clamp to the end wall in an adjustable manner to selectively and alternately clamp the end caps against the end wall in order to prevent rotation of the seal member or to unclamp the end caps from the end wall to permit such rotation.

8. A furnace as in claim 1 including an entrance end at which the access opening is located.

9. A furnace as in claim 1 including an exit end at which the access opening is located.

10. A furnace as in claim 1 wherein the conveyor is of the roller type including a plurality of rolls spaced along the length of conveyance.

11. In a furnace including an elongated heating chamber, a horizontal roller conveyor including horizontally extending rolls spaced along the length of the heating chamber to convey glass sheets through the furnace along a horizontal plane, and a horizontally elongated access opening to the heating chamber along the plane of conveyance through the furnace, an adjustable seal for the access opening comprising: an elongated ceramic seal member of fused silica having a rotational axis extending along the length thereof; said seal member including a pair of round ends each of which includes an associated end cap; a support including a pair of bearings for respectively mounting the pair of end caps for rotation so as to rotatably mount the ceramic seal member about its rotational axis above the access opening of the furnace; the ceramic seal member including an intermediate section having an outer surface; and said outer surface of the seal member including a partially circular surface and a flat surface which have a junction defining an elongated sealing portion that moves toward and away from the plane of conveyance upon rotation of the seal member to thereby control the size of the opening.

12. In a furnace including an elongated heating chamber, a horizontal roller conveyor including horizontally extending rolls spaced along the length of the heating chamber to convey glass sheets through the furnace along a horizontal plane, and an end wall defining a horizontally elongated access opening to the heating chamber along the plane of conveyance through the furnace, an adjustable seal for the access opening comprising: an elongated ceramic seal member of fused silica having a rotational axis extending along the length thereof; said seal member including a pair of round ends each of which includes an associated end cap; the end wall of the furnace including an elongated groove that opens downwardly; a support including a pair of bearings for respectively mounting the pair of end caps for rotation so as to rotatably mount the ceramic seal member about its rotational axis within the groove of the end wall above the access opening of the furnace; the ceramic seal member including an intermediate section having an outer surface; and said outer surface of the seal member including a partially circular surface and a flat surface which have a junction defining an elongated sealing portion that moves toward and away from the plane of conveyance upon rotation of the seal member to thereby control the size of the opening.

13. In a glass sheet tempering system including a furnace having a heating chamber, a horizontal conveyor for conveying glass sheets through the furnace for heating thereof within the heating chamber while being conveyed along a generally horizontally extending plane, a horizontally elongated exit opening to the heating chamber along the plane of conveyance through the furnace, and a quench unit located adjacent the exit opening and having upper and lower blastheads for supplying quenching air to a heated glass sheet therebetween to provide tempering thereof, an adjustable seal for the exit opening comprising: an elongated ceramic seal member of fused silica having a rotational axis extending along the length thereof; a support that rotatably mounts the ceramic seal member about its rotational axis above the exit opening of the furnace; and the ceramic seal member having an elongated sealing portion that moves toward and away from the plane of conveyance upon rotation of the seal member to thereby control the size of the opening.

14. In a glass sheet tempering system including a furnace having an elongated heating chamber, a horizontal roller conveyor including horizontally extending rolls spaced along the length of the heating chamber to convey glass sheets through the furnace along a horizontal plane, horizontally elongated entrance and exit openings to the heating chamber along the plane of conveyance through the furnace, and a quench unit located adjacent the exit opening and having upper and lower blastheads for supplying quenching air to a heated glass sheet therebetween to provide tempering thereof, an adjustable seal for the exit opening comprising: an elongated ceramic seal member of fused silica having a rotational axis extending along the length thereof; said seal member including a pair of round ends each of which includes an associated end cap; a support including a pair of bearings for respectively mounting the pair of end caps for rotation so as to rotatably mount the ceramic seal member about its rotational axis above the access opening of the furnace; the ceramic seal member including an intermediate section having an outer surface; said outer surface of the seal member including a partially circular surface and a flat surface which have a junction defining an elongated sealing portion that moves toward and away from the plane of conveyance upon rotation of the seal member to thereby control the size of the opening; and at least one of the bearings including a locking device for selectively and alternately locking the seal member against rotation or permitting such rotation and the end cap associated therewith including an adjuster for rotating the seal member as permitted by the locking device to move the sealing portion of the seal member toward or away from the plane of conveyance.

15. A furnace as in claim 14 further including an identical seal for the entrance opening thereof into the heating chamber.

* * * * *

UNITED STATES PATENT AND TRADEMARK OFFICE
CERTIFICATE OF CORRECTION

PATENT NO. : 4,407,650
DATED : October 4, 1983
INVENTOR(S) : Robert L. Greenler

It is certified that error appears in the above—identified patent and that said Letters Patent is hereby corrected as shown below:

Column 5, line 63, "22" should read -- 32 --.

Column 6, line 68, after "elongated" insert --sealing--.

Signed and Sealed this

Third Day of April 1984

[SEAL]

Attest:

GERALD J. MOSSINGHOFF

Attesting Officer     Commissioner of Patents and Trademarks